United States Patent
Kucharczyk et al.

[11] Patent Number: 5,338,147
[45] Date of Patent: Aug. 16, 1994

[54] HOIST APPARATUS FOR CARGO COMPARTMENT

[75] Inventors: Jerzy W. Kucharczyk, 20438 - 91A Avenue, Langley, British Columbia, Canada, V1M 1B4; Jan Skrzypczak, Surrey, Canada

[73] Assignee: Jerzy W. Kucharczyk, Langley, Canada

[21] Appl. No.: 956,997

[22] Filed: Oct. 6, 1992

[51] Int. Cl.$^5$ .............................................. B60P 1/00
[52] U.S. Cl. ..................................... 414/542; 187/9 R
[58] Field of Search ............... 414/460, 461, 539, 540, 414/541, 542, 543, 544, 560, 561; 187/9 R, 9 E; 212/267

[56] References Cited

U.S. PATENT DOCUMENTS

| | | | |
|---|---|---|---|
| 3,006,486 | 10/1961 | Cook et al. | 414/542 |
| 3,572,513 | 3/1971 | Tantlinger et al. | 414/542 X |
| 4,297,071 | 10/1981 | Dunbar | 414/542 |
| 4,360,307 | 11/1982 | Larsson | 414/542 |
| 4,425,071 | 1/1984 | Dunbar | 414/542 |
| 4,810,160 | 3/1989 | Emiliani et al. | 414/543 |
| 5,062,760 | 11/1991 | Samaniego | 414/542 |

Primary Examiner—Michael S. Huppert
Assistant Examiner—James T. Eller, Jr.

[57] ABSTRACT

For use in transferring goods into and from a cargo compartment of a vehicle, trailer, container or the like, a hoist apparatus has a first frame having a pair of opposite side members extending in a first horizontal direction, the I-beams each having a vertical web and horizontal upper and lower flanges. The first frame is supported on rollers beneath the roof of the cargo compartment so as to allow displacement of the first frame in the first horizontal direction between a first, retracted position, in which the first frame is accommodated entirely within the cargo compartment, and a second, extended position, in which the first frame protrudes from the cargo compartment. A second frame or bridge extends horizontally between the opposite side members of the first frame and is supported on rollers on the first frame for movement along the side members. The second frame has a pair of opposite side members extending transversely of the first horizontal direction and a hoist carriage is mounted on the second frame for movement along the side members thereof. At least a major portion of the depths of the second frame and of the hoist carriage are located above the underside of the first frame, so as to counteract obstruction of the headroom within the compartment.

8 Claims, 4 Drawing Sheets

HOIST APPARATUS FOR CARGO COMPARTMENT

BACKGROUND OF THE INVENTION

1. Field of the Invention

The present invention relates to hoist apparatus for use in transferring goods into and from a cargo compartment of e.g. a truck, trailer or other vehicle or the floor of a container.

2. Description of the Related Art

In U.S. Pat. No. 5,062,760, issued Nov. 5, 1991 to Felix Samaniego, there is disclosed a material handling system mounted adjacent the roof of a cargo compartment of an enclosed van or trailer. This prior system has a so-called X-axis frame, which traverses the length of the compartment, a series of Y-axis frames, which traverse the width of the compartment, and a hoist which traverses the vertical axis of the compartment and is mounted on the X-axis frame. The X-axis frame is suspended from the Y-axis frames by a carriage assembly, which allows the X-axis frame to move throughout the longitudinal or X-axis and the transverse or Y-axis of the compartment and drive means are provided for moving the X-axis frame through the X- and Y-axes of the compartment.

In this prior apparatus, since the X-axis frame is located entirely beneath the Y-axis frames, the headroom available within the compartment is obstructed or reduced by the height of the X-axis frame plus the height of the Y-axis frames.

BRIEF SUMMARY OF THE INVENTION

It is an object of the present invention to provide a novel and improved hoist apparatus for use in transferring goods into and from a cargo compartment of a vehicle which provides improved headroom within the compartment.

According to the present invention, there is provided a hoist apparatus for use in the cargo compartment of a vehicle, which has a first frame with a pair of opposite side members extending in a first horizontal direction. The first frame is supported on rollers beneath the roof of the cargo compartment so as to be displaceable between a first, retracted position, in which the frame is accommodated entirely within the cargo compartment, and a second, extended position, in which the frame protrudes from the cargo compartment.

A hoist carriage is mounted on a second frame, which extends horizontally between opposite sides of the first frame.

In order to reduce the obstruction of the headroom in the compartment by the hoist apparatus, a major portion of the height of the second frame, and of the hoist carriage, are located above the underside of the first frame. Consequently the obstruction of the headroom in the interior of the compartment is only slightly greater than that resulting from the provision of the first frame in the compartment and is substantially less than the combined heights of the first and second frames.

The hoist carriage is moveable along opposite side members of the second frame, in a direction transverse to the first horizontal direction, so that the hoist itself can be located close to the opposite side walls of the cargo compartment.

BRIEF DESCRIPTION OF THE DRAWINGS

Further features, objects and advantages of the present invention will be more readily apparent from the following description thereof when taken in conjunction with the accompanying drawings, in which:-

DESCRIPTION OF THE PREFERRED EMBODIMENTS

Figure 1:
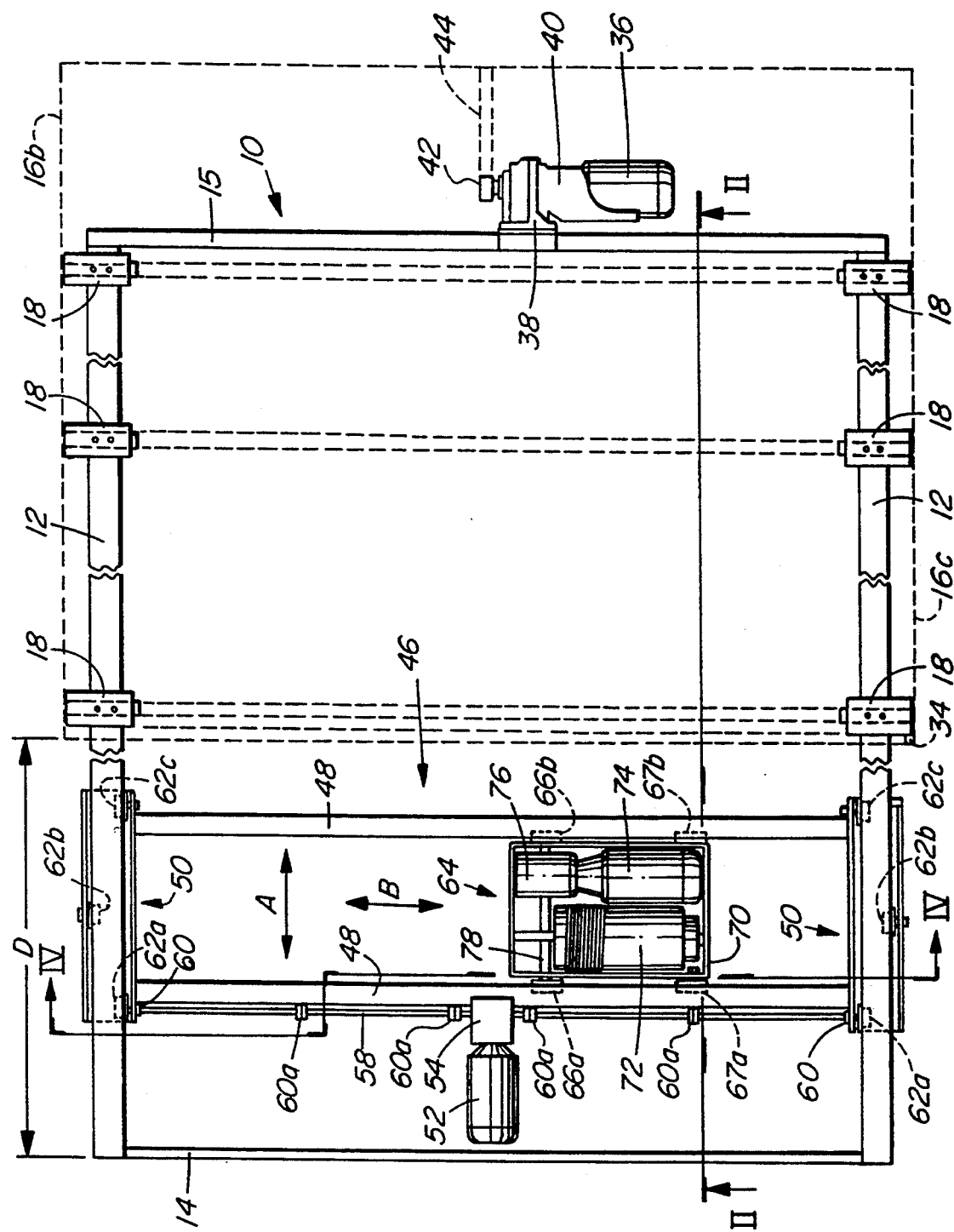
FIG. 1 shows a plan view of a hoist apparatus according to the present invention.

In the accompanying drawings, reference numeral 10 indicates generally a horizontally extending, rectangular first frame, which is constructed from a pair of side members, in the form of I-beams 12, which extend parallel to one another and which are connected, at opposite ends thereof, by cross-members 14 and 15.

Figure 2:
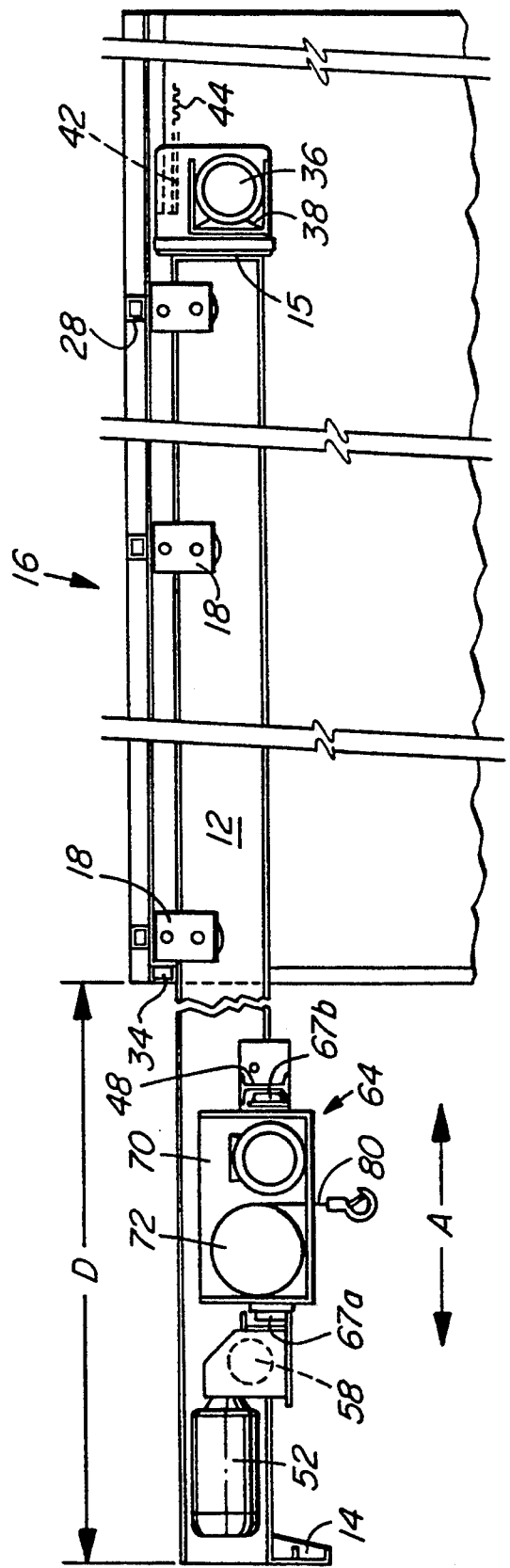
FIG. 2 shows a view taken in cross section along the line II—II of FIG. 1.

As can be seen from FIG. 2, the cross-member 14 extends beneath the I-beams 12 and is secured to lower flanges of the I-beams 12 by welding. Cross-member 15 comprises a U-shaped channel member having upper and lower flanges aligned with upper and lower flanges 12a and 12b of the I-beams 12 and secured to the I-beams 12 by welding.

The first frame 10 is suspended from the underside of the roof of a cargo compartment 16 of a vehicle by means of roller support devices 18. The compartment 16 has a roof 16a and opposite side walls 16b and 16c. To facilitate the illustration of the hoist apparatus, the compartment 16 is shown in broken lines in FIG. 1.

Figure 3:
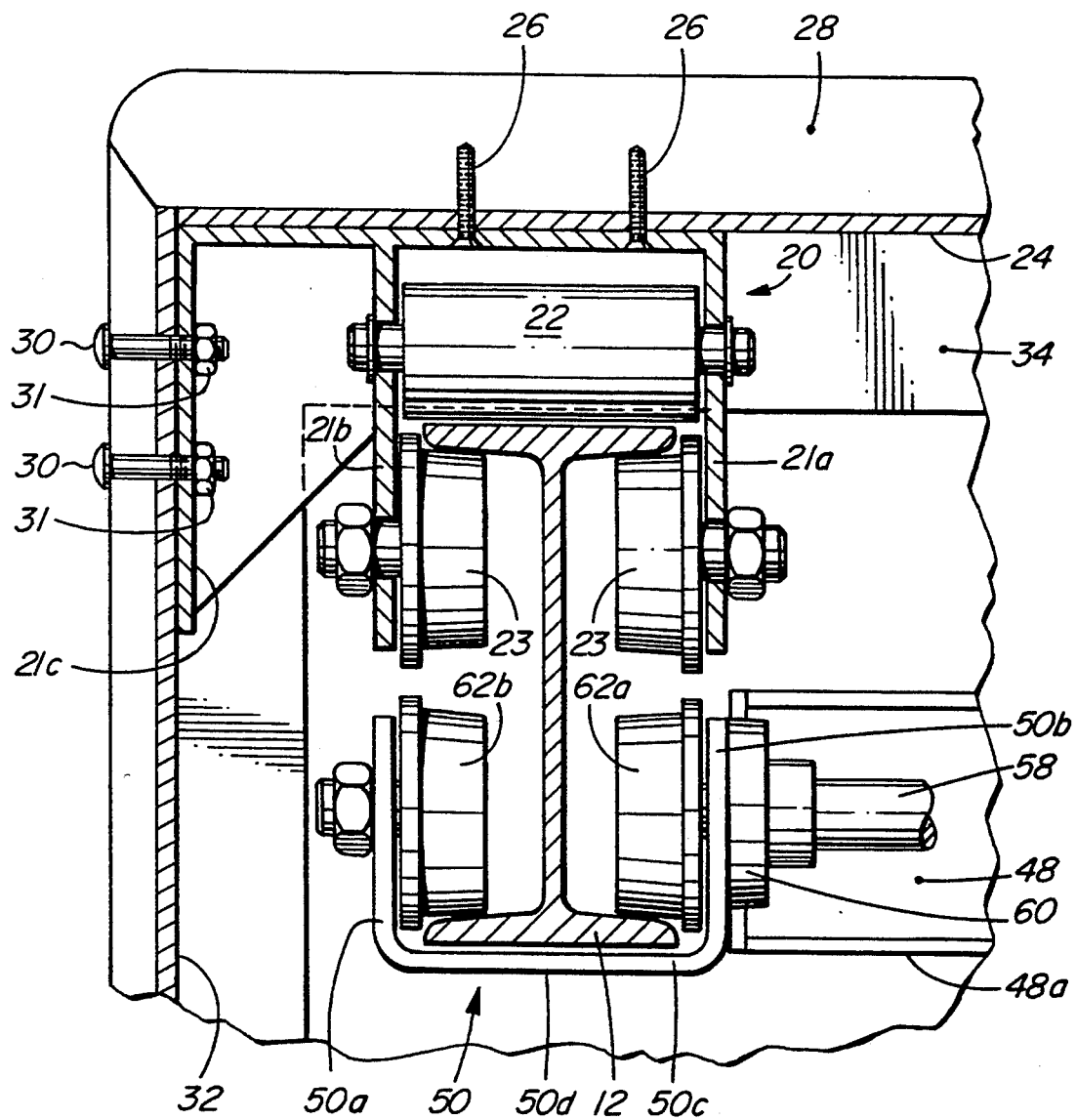
FIG. 3 shows a portion of FIG. 2 on an enlarged scale.

The roller support devices 18 each comprise an inverted double channel member section indicated generally by reference numeral 20 (FIG. 3), having first and second vertical flanges 21a and 21b, to which is journalled a first roller 22, in rolling engagement with the upper flanges of the respective I-beams 12, and a pair of opposed rollers 23. The rollers 23 are located at opposite sides of the vertical web of the respective I-beam 12, in rolling contact with the undersides of the upper flanges 23a of the I-beam 12.

The channel member section 20 is secured to a ceiling 24 of the compartment 16 by screws 26, which extend through the channel member section 20 into a roof bow 28 forming part of the roof of the compartment 16.

The channel member section 20 has a third flange 21c which is secured by bolts 30 and nuts 31 to a lining 32 of the side wall 16a of the compartment 16.

The rear end of the compartment has a door opening defined by a door frame 34 (FIG. 1).

The first frame 10 is supported by the roller support devices 18 at the underside of the cargo compartment roof 16a so as to be movable to and fro, as indicated by double-headed arrow A in FIGS. 1 and 2, in a first horizontal direction between a retracted first position, in which the first frame 10 is accommodated entirely within the cargo compartment 16 and an extended, second position, in which the first frame 10 is shown in FIGS. 1 and 2, and in which the first frame 10 protrudes through the door frame 31 from the interior of the cargo compartment by a distance D.

At the rear end of the first frame 10, an electric motor 36 is mounted by means of a support bracket 38 on the cross-member 15. The electric motor 36 drives a reduction gearing 40, which in turn drives a pinion 42. The pinion 42 meshes with a rack 44 secured beneath the compartment roof 16a. The electric motor 36 can thus effect the to and fro movement of the first frame as indicated by the arrow A.

The first frame 10 carries a second frame or bridge, which is indicated generally by reference numeral 46.

The second frame 46 is formed by a pair of opposite side members 48, in the form of I-beams, extending between the I-beams 12 of the first frame 10, and a pair of upwardly-open U-shaped channel members indicated generally by reference numeral 50, which are welded to the ends of the I-beams 48 and extend at right angles to the I-beams 48. The lower flanges 12b of the I-beams 12 are received into the channel members 12.

Each of the end members 50 is provided with rollers 52 (FIG. 3), which are journalled in the respective end member 50, and which are in rolling engagement with the tops of the lower flanges 12b of the respective I-beam 12.

More particularly, the channel members 50 each comprise opposed flanges 50a, 50b connected by an intermediate web 50c. As can be seen from FIG. 3, the undersides of the lower flanges 12b of the I-beam 12 are located at a small clearance above the intermediate web 50c. The undersides 48d of the side members 48 of the second frame 46 are located at a level above the underside 50d of the intermediate web 50c, so as to be substantially level with the underside of the lower flange 12b of the I-beam 12.

Consequently, the depth of the present hoist apparatus is increased, by the provision of the second frame 46, only by a very small amount, which is equal to the thickness of the intermediate web 50c and the clearance of the latter from the underside of the I-beam 12.

An electric motor 52 is mounted as shown on one of the side members 48 of the second frame 46. The electric motor 52 drives a reduction gearing 54 which, in turn, through a worm gear (not shown) rotates a shaft 58.

The shaft 58 extends parallel to the side members 48 of the second frame 46 and, at its opposite ends, is supported in bearings 60 on the flanges of the channel members 50. At its opposite ends, the shaft 58 is connected by couplings 60a mounted on the adjacent frame side member 48 to rollers 62a. The rollers 62a are in rolling contact with the lower flanges 12b of the I-beams 12 so that, on energization of the motor 52, the rollers 62a rotate in frictional engagement with the I-beams 12 and thus displace the second frame 46 to and fro, as also indicated by the arrow A, relative to the first frame 10.

The channel members 50 also have idler rollers 62b and 62c, journalled in the flanges 50a and 50b, respectively. The rollers 62a and 62c roll along the lower flanges 12b.

A hoist carriage indicated generally by reference numeral 64 is located between the side members 48 of the second frame 46.

The hoist carriage 64 is supported on the side members 48 of the second frame 46, at opposite sides thereof, by two pairs of rollers 66a, 66b and 67a, 67b which are in rolling contact with the tops of the lower flanges of the I-beams forming the side members 48 of the second frame 46.

Figure 4:
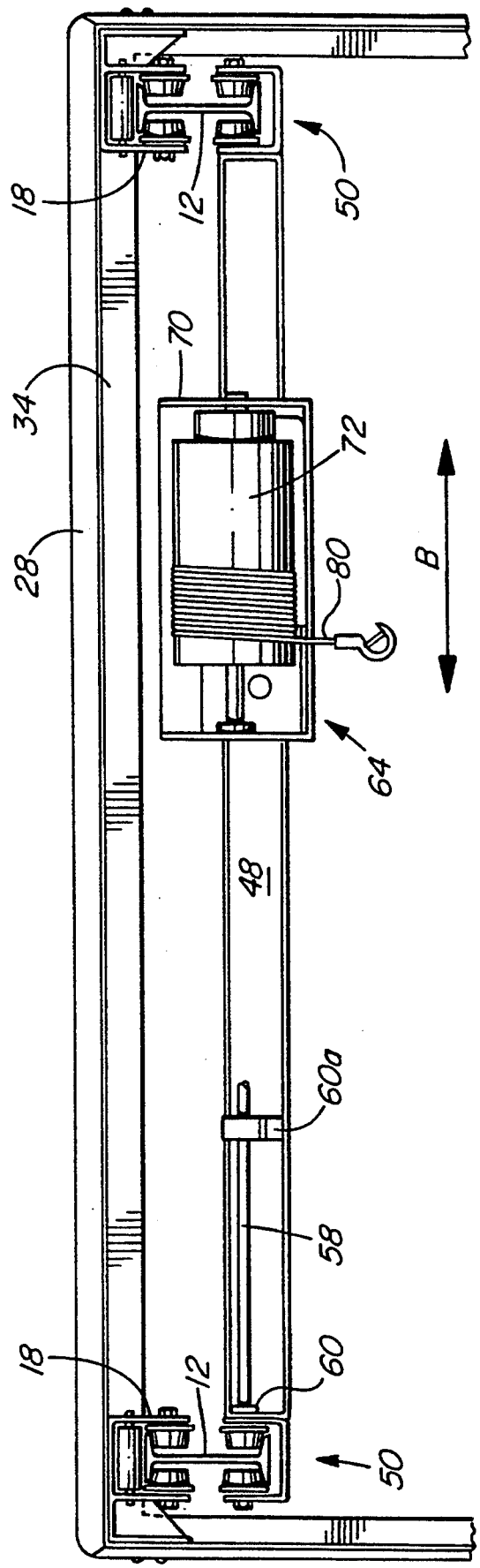
FIG. 4 shows a view taken in cross-section along the line III—III of FIG. 1.

The hoist carriage 64 can thus be displaced to and fro, as indicated by double-headed arrows B in FIGS. 1 and 4, along the side members 48 of the second frame 46.

The hoist carriage 64 comprises an open-topped housing 70 containing a hoist 72, which comprises a cable drum rotatably mounted in the housing 38 and containing an electric motor (not shown) for rotating the cable drum. The housing 70 also contains an electric motor 74 and a reduction gearing 76 for rotating a shaft 78. The rollers 66a and 66b are fixed to the ends of the shaft 78, which is journalled in the opposite sides of the housing 70. The motor 74 thus drives the hoist carriage 64 to and fro as indicated by the arrow B.

A hoist cable 80 is wound around the drum of the hoist 72 so as to be raised and lowered by the rotation of the hoist drum.

As can be seen from FIG. 2, the bottom of the hoist carriage 64 projects only slightly below the underside of the second frame 46 and, in fact, to a depth which is determined by the axes of the rollers 66a, 66b and 67a, 67b and, thus, by the location of the electric motor 74 driving these rollers.

The cross-member 14 is located beneath the I-beams 12, to enable the motor 52 to project beyond the cross-member 14 when the second frame 46 is moved leftwards, as viewed in FIG. 2, to the maximum possible extent. However, since the cross-member 14 is located at the outer end of the first frame 10, and fits with the compartment 16 at a location adjacent the door frame 34 when the first frame 10 is retracted into the compartment 16, the cross-member 14 does not obstruct the headroom of the compartment 16 beyond this location.

FIG. 2 also shows that the underside of the bracket 38 supporting the motor 36 is substantially level with the underside of the first frame 10. Consequently, the motor 36 and its bracket 38 do not obstruct the headroom of the compartment 16 below the first frame 10.

The rollers 62a, 62b; 66a, 66b and 67a, 67b are lagged, i.e. have resilient rolling surfaces, to improve the traction between these rollers and the I-beams. This is particularly advantageous when the hoist apparatus is inclined, as a result of its vehicle being on a slope or an uneven grade, and when the apparatus is used in adverse weather conditions in which there is snow, water or ice on the apparatus and, consequently, parts of the apparatus are slippery.

If the vehicle compartment 16 lacks torsional rigidity, the first and second frames 10 and 46 may become twisted. To avoid binding of the apparatus in such circumstances, the rollers 62a, 62b; 66a, 66b and 67a, 67b are equipped with selfaligning bearings.

The rollers 22, bearing on the tops of the I-beams 12, counteract bending of the I-beams 12 under load.

In operation of the above-described apparatus, the first frame 10 can be moved by the motor 36 so as to project by the distance D from the compartment when it is required to load goods to and from the compartment 16.

The second frame 46 can then be moved to and fro along the first frame 10, and the hoist carriage 64 can be moved to and fro along the second frame 46, to position the hoist 72 as desired for picking up, moving and depositing the goods. The first frame 10 can be retracted into the compartment 16 to provide access for the hoist 72 to the area of the compartment 16 remote from the door frame 34.

As will be apparent to those skilled in the art, various modifications may be made to the above described apparatus within the scope of the appended claims.

Thus, for example, the rack 44 and the pinion 42 may be replaced by some other type of positive drive, for example a chain and sprocket device. The electric motors 36, 54 and 74 may be replaced by hydraulic or pneumatic motors. Also, it is possible to attach the roller support devices 18 to a support structure (not shown) which is separate from the compartment roof 16a and mounted beneath the compartment roof 16a.

We claim:

1. A hoist apparatus for use in a cargo compartment, said hoist apparatus comprising:

a first frame;

said first frame having a pair of opposite I-beams extending in a first horizontal direction and said I-beams each having a vertical web and horizontal upper and lower flanges;

first roller means supporting said first frame beneath the roof of the cargo compartment so as to allow displacement of said first frame in the first horizontal direction between a first, retracted position, in which said first frame is accommodated entirely within the cargo compartment, and a second, extended position, in which said first frame protrudes from the cargo compartment;

said first roller means comprising support rollers in rolling contact with the undersides of said upper flanges;

a second frame extending horizontally between said opposite side members of said first frame;

second roller means supporting said second frame on said first frame for movement along said I-beams;

said second roller means comprising support rollers in rolling contact with the tops of said lower flanges;

said second frame having a pair of opposite side members extending transversely of said first horizontal direction;

a hoist carriage mounted on said second frame;

a major portion of the height of said second frame and of said hoist carriage being located above the underside of said first frame;

third roller means for supporting said hoist carriage on said second frame for movement along said side members of said second frame;

a hoist mounted on said hoist carriage;

a first drive device for displacing said first frame to and fro in said first direction between the retracted and extended positions;

a second drive device for displacing said second frame to and fro along said I-beams; and a hoist carriage drive device for displacing said hoist carriage and therewith said hoist to and fro along said side members of said second frame.

2. A hoist apparatus for use in a cargo compartment, said hoist apparatus comprising:

a first frame;

said first frame having a pair of opposite side members extending in a first horizontal direction;

said side members having upper and lower flanges;

first roller means supporting said first frame beneath the roof of the cargo compartment so as to allow displacement of said first frame in the first horizontal direction between a first, retracted position, in which said first frame is accommodated entirely within the cargo compartment, and a second, extended position, in which said first frame protrudes from the cargo compartment;

said first roller means comprising support rollers in rolling contact with the undersides of said upper flanges of said side members;

a second frame extending horizontally between said opposite side members of said first frame;

second roller means supporting said second frame on said first frame for movement along said side members;

said second roller means comprising support rollers in rolling contact with the tops of said lower flanges;

said second frame having a pair of opposite side members extending transversely of said first horizontal direction;

a hoist carriage mounted on said second frame;

a major portion of the height of said second frame and of said hoist carriage being located above the underside of said first frame;

third roller means for supporting said hoist carriage on said second frame for movement along said side members of said second frame;

a hoist mounted on said hoist carriage;

a first drive device for displacing said first frame to and fro in said first direction between the retracted and extended positions; and a hoist carriage drive device for displacing said hoist carriage and therewith said hoist to and fro along said side members of said second frame.

3. A hoist apparatus as claimed in claim 2, wherein:

said opposite side members of said first frame comprise I-beams having upper and lower flanges;

said second frame comprises upwardly-open channel members at opposite ends thereof, said channel members each having opposite vertical side flanges and an intermediate web connecting said side flanges;

said second roller means being journalled in said side flanges and in rolling contact with the tops of said lower flanges of said I-beams;

said lower flanges of said I-beams being received within said channel members with said lower flanges thereof adjacent said intermediate webs and with a clearance between the undersides of said lower flanges and said intermediate webs; and said opposite side members of said second frame being connected to said channel members with the undersides of said second frame opposite side members at a level above the undersides of said channel member intermediate webs.

4. A hoist apparatus as claimed in claim 3, wherein said first roller means are in rolling engagement with the undersides of said upper flanges of said I-beams, said hoist apparatus further comprising fourth roller means spaced apart along said compartment and in rolling engagement with the tops of said I-beams to counteract bending of said I-beams under load during the operation of said hoist apparatus.

5. A hoist apparatus as claimed in claim 2, wherein said opposite side members of said first frame comprise I-beams having upper and lower flanges and said first roller means arc in rolling engagement with the undersides of said upper flanges of said I-beams, said hoist apparatus further comprising fourth roller means spaced apart along said compartment and in rolling engagement with the tops of said I-beams to counteract bending of said I-beams under load during the operation of said hoist apparatus.

6. A hoist apparatus as claimed in claim 2, wherein said first drive device comprises a positive drive device.

7. A hoist apparatus as claimed in claim 2, wherein said first drive device comprises an electric motor mounted on said first frame and a rack and pinion mechanism connecting said electric motor to the roof of said compartment.

8. A hoist apparatus as claimed in claim 2, wherein said support rollers have resilient rolling surfaces to enhance traction between said support rollers and said opposite side members of said first frame.

* * * * *